United States Patent
Scheuermann

(10) Patent No.: US 7,822,109 B2
(45) Date of Patent: *Oct. 26, 2010

(54) METHOD AND SYSTEM FOR RECONFIGURABLE CHANNEL CODING

(75) Inventor: W. James Scheuermann, Saratoga, CA (US)

(73) Assignee: QST Holdings, LLC., Palo Alto, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 10/402,691

(22) Filed: Mar. 28, 2003

(65) Prior Publication Data

US 2003/0190910 A1  Oct. 9, 2003

Related U.S. Application Data

(63) Continuation of application No. 09/851,543, filed on May 8, 2001, now Pat. No. 6,577,678.

(51) Int. Cl.
*H04B 1/38* (2006.01)
*H04L 5/12* (2006.01)

(52) U.S. Cl. .................................... 375/222; 375/262

(58) Field of Classification Search ................ 375/219, 375/222, 259, 285, 295, 316; 455/418, 552; 714/795

See application file for complete search history.

(56) References Cited

U.S. PATENT DOCUMENTS

| | | | |
|---|---|---|---|
| 3,409,175 A | 11/1968 | Byrne | |
| 3,665,171 A | 5/1972 | Morrow | |
| 3,666,143 A | 5/1972 | Weston | |
| 3,938,639 A | 2/1976 | Birrell | |
| 3,949,903 A | 4/1976 | Benasutti et al. | |
| 3,960,298 A | 6/1976 | Birrell | |
| 3,967,062 A | 6/1976 | Dobias | |
| 3,991,911 A | 11/1976 | Shannon et al. | |
| 3,995,441 A | 12/1976 | McMillin | |
| 4,076,145 A | 2/1978 | Zygiel | |

(Continued)

FOREIGN PATENT DOCUMENTS

DE    100 18 374 A1    10/2001

(Continued)

OTHER PUBLICATIONS

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

(Continued)

*Primary Examiner*—Don N Vo
(74) *Attorney, Agent, or Firm*—Nixon Peabody LLP

(57) ABSTRACT

Aspects of a reconfigurable system for providing channel coding in a wireless communication device are described. The aspects include a plurality of computation elements for performing channel coding operations and memory for storing programs to direct each of the plurality of computation elements. A controller controls the plurality of computation elements and stored programs to achieve channel coding operations in accordance with a plurality of wireless communication standards. The plurality of computation elements include a data reordering element, a linear feedback shift register (LFSR) element, a convolutional encoder element, and a Viterbi decoder element.

30 Claims, 7 Drawing Sheets

U.S. PATENT DOCUMENTS

| | | | |
|---|---|---|---|
| 4,143,793 A | 3/1979 | McMillin et al. | |
| 4,172,669 A | 10/1979 | Edelbach | |
| 4,174,872 A | 11/1979 | Fessler | |
| 4,181,242 A | 1/1980 | Zygiel et al. | |
| RE30,301 E | 6/1980 | Zygiel | |
| 4,218,014 A | 8/1980 | Tracy | |
| 4,222,972 A | 9/1980 | Caldwell | |
| 4,237,536 A | 12/1980 | Enelow et al. | |
| 4,252,253 A | 2/1981 | Shannon | |
| 4,302,775 A | 11/1981 | Widergren et al. | |
| 4,333,587 A | 6/1982 | Fessler et al. | |
| 4,354,613 A | 10/1982 | Desai et al. | |
| 4,377,246 A | 3/1983 | McMillin et al. | |
| 4,380,046 A | 4/1983 | Frosch | |
| 4,393,468 A | 7/1983 | New | |
| 4,413,752 A | 11/1983 | McMillin et al. | |
| 4,458,584 A | 7/1984 | Annese et al. | |
| 4,466,342 A | 8/1984 | Basile et al. | |
| 4,475,448 A | 10/1984 | Shoaf et al. | |
| 4,509,690 A | 4/1985 | Austin et al. | |
| 4,520,950 A | 6/1985 | Jeans | |
| 4,549,675 A | 10/1985 | Austin | |
| 4,553,573 A | 11/1985 | McGarrah | |
| 4,560,089 A | 12/1985 | McMillin et al. | |
| 4,577,782 A | 3/1986 | Fessler | |
| 4,578,799 A | 3/1986 | Scholl et al. | |
| RE32,179 E | 6/1986 | Sedam et al. | |
| 4,633,386 A | 12/1986 | Terepin et al. | |
| 4,649,512 A | 3/1987 | Nukiyama | |
| 4,658,988 A | 4/1987 | Hassell | |
| 4,694,416 A | 9/1987 | Wheeler et al. | |
| 4,711,374 A | 12/1987 | Gaunt et al. | |
| 4,713,755 A | 12/1987 | Worley, Jr. et al. | |
| 4,719,056 A | 1/1988 | Scott | |
| 4,726,494 A | 2/1988 | Scott | |
| 4,747,516 A | 5/1988 | Baker | |
| 4,748,585 A | 5/1988 | Chiarulli et al. | |
| 4,758,985 A | 7/1988 | Carter | |
| 4,760,525 A | 7/1988 | Webb | |
| 4,760,544 A | 7/1988 | Lamb | |
| 4,765,513 A | 8/1988 | McMillin et al. | |
| 4,766,548 A | 8/1988 | Cedrone et al. | |
| 4,781,309 A | 11/1988 | Vogel | |
| 4,800,492 A | 1/1989 | Johnson et al. | |
| 4,811,214 A | 3/1989 | Nosenchuck et al. | |
| 4,824,075 A | 4/1989 | Holzboog | |
| 4,827,426 A | 5/1989 | Patton et al. | |
| 4,850,269 A | 7/1989 | Hancock et al. | |
| 4,856,684 A | 8/1989 | Gerstung | |
| 4,870,302 A | 9/1989 | Freeman | |
| 4,901,887 A | 2/1990 | Burton | |
| 4,905,231 A | 2/1990 | Leung et al. | |
| 4,921,315 A | 5/1990 | Metcalfe et al. | |
| 4,930,666 A | 6/1990 | Rudick | |
| 4,932,564 A | 6/1990 | Austin et al. | |
| 4,936,488 A | 6/1990 | Austin | |
| 4,937,019 A | 6/1990 | Scott | |
| 4,960,261 A | 10/1990 | Scott et al. | |
| 4,961,533 A | 10/1990 | Teller et al. | |
| 4,967,340 A | 10/1990 | Dawes | |
| 4,974,643 A | 12/1990 | Bennett et al. | |
| 4,982,876 A | 1/1991 | Scott | |
| 4,993,604 A | 2/1991 | Gaunt et al. | |
| 5,007,560 A | 4/1991 | Sassak | |
| 5,021,947 A | 6/1991 | Campbell et al. | |
| 5,040,106 A | 8/1991 | Maag | |
| 5,044,171 A | 9/1991 | Farkas | |
| 5,090,015 A | 2/1992 | Dabbish et al. | |
| 5,099,418 A | 3/1992 | Pian et al. | |
| 5,129,549 A | 7/1992 | Austin | |
| 5,139,708 A | 8/1992 | Scott | |
| 5,144,166 A | 9/1992 | Camarota et al. | |
| 5,156,301 A | 10/1992 | Hassell et al. | |
| 5,156,871 A | 10/1992 | Goulet et al. | |
| 5,165,023 A | 11/1992 | Gifford | |
| 5,165,575 A | 11/1992 | Scott | |
| 5,177,700 A | 1/1993 | Göckler | |
| 5,190,083 A | 3/1993 | Gupta et al. | |
| 5,190,189 A | 3/1993 | Zimmer et al. | |
| 5,193,151 A | 3/1993 | Jain | |
| 5,193,718 A | 3/1993 | Hassell et al. | |
| 5,202,993 A | 4/1993 | Tarsy et al. | |
| 5,203,474 A | 4/1993 | Haynes | |
| 5,218,240 A | 6/1993 | Camarota et al. | |
| 5,240,144 A | 8/1993 | Feldman | |
| 5,245,227 A | 9/1993 | Furtek et al. | |
| 5,261,099 A | 11/1993 | Bigo et al. | |
| 5,263,509 A | 11/1993 | Cherry et al. | |
| 5,269,442 A | 12/1993 | Vogel | |
| 5,280,711 A | 1/1994 | Motta et al. | |
| 5,297,400 A | 3/1994 | Benton et al. | |
| 5,301,100 A | 4/1994 | Wagner | |
| 5,303,846 A | 4/1994 | Shannon | |
| 5,335,276 A | 8/1994 | Thompson et al. | |
| 5,336,950 A | 8/1994 | Popli et al. | |
| 5,339,428 A | 8/1994 | Burmeister et al. | |
| 5,343,716 A | 9/1994 | Swanson et al. | |
| 5,361,362 A | 11/1994 | Benkeser et al. | |
| 5,367,651 A | 11/1994 | Smith et al. | |
| 5,367,687 A | 11/1994 | Tarsy et al. | |
| 5,368,198 A | 11/1994 | Goulet | |
| 5,379,343 A | 1/1995 | Grube et al. | |
| 5,381,546 A | 1/1995 | Servi et al. | |
| 5,381,550 A | 1/1995 | Jourdenais et al. | |
| 5,388,062 A | 2/1995 | Knutson | |
| 5,388,212 A | 2/1995 | Grube et al. | |
| 5,392,960 A | 2/1995 | Kendt et al. | |
| 5,428,754 A | 6/1995 | Baldwin | |
| 5,437,395 A | 8/1995 | Bull et al. | |
| 5,442,306 A * | 8/1995 | Woo | 326/39 |
| 5,446,745 A * | 8/1995 | Gibbs | 714/758 |
| 5,450,557 A | 9/1995 | Kopp et al. | |
| 5,454,406 A | 10/1995 | Rejret et al. | |
| 5,465,368 A | 11/1995 | Davidson et al. | |
| 5,475,856 A | 12/1995 | Kogge | |
| 5,479,055 A | 12/1995 | Eccles | |
| 5,490,165 A | 2/1996 | Blakeney, II et al. | |
| 5,491,823 A | 2/1996 | Ruttenberg | |
| 5,504,891 A | 4/1996 | Motoyama et al. | |
| 5,507,009 A | 4/1996 | Grube et al. | |
| 5,515,519 A | 5/1996 | Yoshioka et al. | |
| 5,517,600 A | 5/1996 | Shimokawa | |
| 5,519,694 A | 5/1996 | Brewer et al. | |
| 5,522,070 A | 5/1996 | Sumimoto | |
| 5,530,964 A | 6/1996 | Alpert et al. | |
| 5,534,796 A | 7/1996 | Edwards | |
| 5,542,265 A | 8/1996 | Rutland | |
| 5,553,755 A | 9/1996 | Bonewald et al. | |
| 5,555,417 A | 9/1996 | Odnert et al. | |
| 5,560,028 A | 9/1996 | Sachs et al. | |
| 5,560,038 A | 9/1996 | Haddock | |
| 5,570,587 A | 11/1996 | Kim | |
| 5,572,572 A | 11/1996 | Kawan et al. | |
| 5,590,353 A | 12/1996 | Sakakibara et al. | |
| 5,594,657 A | 1/1997 | Cantone et al. | |
| 5,600,810 A | 2/1997 | Ohkami | |
| 5,600,844 A | 2/1997 | Shaw et al. | |
| 5,602,833 A | 2/1997 | Zehavi | |
| 5,603,043 A | 2/1997 | Taylor et al. | |
| 5,607,083 A | 3/1997 | Vogel et al. | |
| 5,608,643 A | 3/1997 | Wichter et al. | |
| 5,611,867 A | 3/1997 | Cooper et al. | |
| 5,623,545 A | 4/1997 | Childs et al. | |
| 5,625,669 A | 4/1997 | McGregor et al. | |

| | | | | | |
|---|---|---|---|---|---|
| 5,626,407 A | 5/1997 | Westcott | 5,892,950 A | 4/1999 | Rigori et al. |
| 5,630,206 A | 5/1997 | Urban et al. | 5,892,961 A | 4/1999 | Trimberger |
| 5,635,940 A | 6/1997 | Hickman et al. | 5,892,962 A | 4/1999 | Cloutier |
| 5,646,544 A | 7/1997 | Iadanza | 5,894,473 A | 4/1999 | Dent |
| 5,646,545 A | 7/1997 | Trimberger et al. | 5,901,884 A | 5/1999 | Goulet et al. |
| 5,647,512 A | 7/1997 | Assis Mascarenhas deOliveira et al. | 5,903,886 A | 5/1999 | Heimlich et al. |
| | | | 5,907,285 A | 5/1999 | Toms et al. |
| 5,667,110 A | 9/1997 | McCann et al. | 5,907,580 A | 5/1999 | Cummings |
| 5,668,817 A * | 9/1997 | Adham ............... 714/732 | 5,910,733 A | 6/1999 | Bertolet et al. |
| 5,684,793 A | 11/1997 | Kiema et al. | 5,912,572 A | 6/1999 | Graf, III |
| 5,684,980 A | 11/1997 | Casselman | 5,913,172 A | 6/1999 | McCabe et al. |
| 5,687,236 A | 11/1997 | Moskowitz et al. | 5,917,852 A | 6/1999 | Butterfield et al. |
| 5,694,613 A | 12/1997 | Suzuki | 5,920,801 A | 7/1999 | Thomas et al. |
| 5,694,794 A | 12/1997 | Jerg et al. | 5,931,918 A | 8/1999 | Row et al. |
| 5,699,328 A | 12/1997 | Ishizaki et al. | 5,933,642 A | 8/1999 | Greenbaum et al. |
| 5,701,398 A | 12/1997 | Glier et al. | 5,940,438 A | 8/1999 | Poon et al. |
| 5,701,482 A | 12/1997 | Harrison et al. | 5,949,415 A | 9/1999 | Lin et al. |
| 5,704,053 A | 12/1997 | Santhanam | 5,950,011 A | 9/1999 | Albrecht et al. |
| 5,706,191 A | 1/1998 | Bassett et al. | 5,950,131 A | 9/1999 | Vilmur |
| 5,706,976 A | 1/1998 | Purkey | 5,951,674 A | 9/1999 | Moreno |
| 5,712,996 A | 1/1998 | Schepers | 5,953,322 A | 9/1999 | Kimball |
| 5,720,002 A | 2/1998 | Wang | 5,956,518 A | 9/1999 | DeHon et al. |
| 5,721,693 A | 2/1998 | Song | 5,956,967 A | 9/1999 | Kim |
| 5,721,854 A | 2/1998 | Ebicioglu et al. | 5,959,811 A | 9/1999 | Richardson |
| 5,729,754 A | 3/1998 | Estes | 5,959,881 A | 9/1999 | Trimberger et al. |
| 5,732,563 A | 3/1998 | Bethuy et al. | 5,963,048 A | 10/1999 | Harrison et al. |
| 5,734,808 A | 3/1998 | Takeda | 5,966,534 A | 10/1999 | Cooke et al. |
| 5,737,631 A | 4/1998 | Trimberger | 5,970,254 A | 10/1999 | Cooke et al. |
| 5,742,180 A | 4/1998 | DeHon et al. | 5,987,105 A | 11/1999 | Jenkins et al. |
| 5,742,821 A | 4/1998 | Prasanna | 5,987,611 A | 11/1999 | Freund |
| 5,745,366 A | 4/1998 | Higham et al. | 5,991,302 A | 11/1999 | Berl et al. |
| RE35,780 E | 5/1998 | Hassell et al. | 5,991,308 A | 11/1999 | Fuhrmann et al. |
| 5,751,295 A | 5/1998 | Becklund et al. | 5,993,739 A | 11/1999 | Lyon |
| 5,754,227 A | 5/1998 | Fukuoka | 5,999,734 A | 12/1999 | Willis et al. |
| 5,758,261 A | 5/1998 | Wiedeman | 6,005,943 A | 12/1999 | Cohen et al. |
| 5,768,561 A | 6/1998 | Wise | 6,006,249 A | 12/1999 | Leong |
| 5,771,362 A | 6/1998 | Bartkowiak et al. | 6,016,395 A | 1/2000 | Mohamed |
| 5,778,439 A | 7/1998 | Trimberger et al. | 6,018,783 A | 1/2000 | Chiang |
| 5,784,636 A | 7/1998 | Rupp | 6,021,186 A | 2/2000 | Suzuki et al. |
| 5,784,699 A | 7/1998 | McMahon et al. | 6,021,492 A | 2/2000 | May |
| 5,787,237 A | 7/1998 | Reilly | 6,023,742 A | 2/2000 | Ebeling et al. |
| 5,790,817 A | 8/1998 | Asghar et al. | 6,023,755 A | 2/2000 | Casselman |
| 5,791,517 A | 8/1998 | Avital | 6,028,610 A | 2/2000 | Deering |
| 5,791,523 A | 8/1998 | Oh | 6,036,166 A | 3/2000 | Olson |
| 5,794,062 A | 8/1998 | Baxter | 6,039,219 A | 3/2000 | Bach et al. |
| 5,794,067 A | 8/1998 | Kadowaki | 6,041,322 A | 3/2000 | Meng et al. |
| 5,802,055 A | 9/1998 | Krein et al. | 6,041,970 A | 3/2000 | Vogel |
| 5,802,278 A | 9/1998 | Isfeld et al. | 6,046,603 A | 4/2000 | New |
| 5,812,851 A | 9/1998 | Levy et al. | 6,047,115 A | 4/2000 | Mohan et al. |
| 5,818,603 A | 10/1998 | Motoyama | 6,052,600 A | 4/2000 | Fette et al. |
| 5,819,255 A | 10/1998 | Celis et al. | 6,055,314 A | 4/2000 | Spies et al. |
| 5,822,308 A | 10/1998 | Weigand et al. | 6,056,194 A | 5/2000 | Kolls |
| 5,822,313 A | 10/1998 | Malek et al. | 6,059,840 A | 5/2000 | Click, Jr. |
| 5,822,360 A | 10/1998 | Lee et al. | 6,061,580 A | 5/2000 | Altschul et al. |
| 5,828,858 A | 10/1998 | Athanas et al. | 6,073,132 A | 6/2000 | Gehman |
| 5,829,085 A | 11/1998 | Jerg et al. | 6,076,174 A | 6/2000 | Freund |
| 5,835,753 A | 11/1998 | Witt | 6,078,736 A | 6/2000 | Guccione |
| 5,838,165 A | 11/1998 | Chatter | 6,085,740 A | 7/2000 | Ivri et al. |
| 5,838,894 A | 11/1998 | Horst | 6,088,043 A | 7/2000 | Kelleher et al. |
| 5,845,815 A | 12/1998 | Vogel | 6,091,263 A | 7/2000 | New et al. |
| 5,854,929 A | 12/1998 | Van Pract et al. | 6,091,765 A | 7/2000 | Pietzold, III et al. |
| 5,860,021 A | 1/1999 | Klingman | 6,094,065 A | 7/2000 | Tavana et al. |
| 5,862,961 A | 1/1999 | Motta et al. | 6,094,726 A | 7/2000 | Gonion et al. |
| 5,870,427 A | 2/1999 | Teidemann, Jr. et al. | 6,111,893 A | 8/2000 | Volftsun et al. |
| 5,873,045 A | 2/1999 | Lee et al. | 6,111,935 A | 8/2000 | Hughes-Hartogs |
| 5,881,106 A | 3/1999 | Cartier | 6,112,218 A | 8/2000 | Gandhi et al. |
| 5,884,284 A | 3/1999 | Peters et al. | 6,115,751 A | 9/2000 | Tam et al. |
| 5,886,537 A | 3/1999 | Macias et al. | 6,119,178 A | 9/2000 | Martin et al. |
| 5,887,174 A | 3/1999 | Simons et al. | 6,120,551 A | 9/2000 | Law et al. |
| 5,889,816 A | 3/1999 | Agrawal et al. | 6,122,670 A | 9/2000 | Bennett et al. |
| 5,889,989 A | 3/1999 | Robertazzi et al. | 6,128,307 A | 10/2000 | Brown |
| 5,890,014 A | 3/1999 | Long | 6,134,605 A | 10/2000 | Hudson et al. |
| 5,892,900 A | 4/1999 | Ginter et al. | 6,134,629 A | 10/2000 | L'Ecuyer |

| | | |
|---|---|---|
| 6,138,693 A | 10/2000 | Matz |
| 6,141,283 A | 10/2000 | Bogin et al. |
| 6,150,838 A | 11/2000 | Wittig et al. |
| 6,154,492 A | 11/2000 | Araki et al. |
| 6,154,494 A | 11/2000 | Sugahara et al. |
| 6,157,997 A | 12/2000 | Oowaki et al. |
| 6,158,031 A | 12/2000 | Mack et al. |
| 6,173,389 B1 | 1/2001 | Pechanek et al. |
| 6,175,854 B1 | 1/2001 | Bretscher |
| 6,175,892 B1 | 1/2001 | Sazzad et al. |
| 6,181,981 B1 | 1/2001 | Varga et al. |
| 6,185,418 B1 | 2/2001 | MacLellan et al. |
| 6,192,070 B1 | 2/2001 | Poon et al. |
| 6,192,255 B1 | 2/2001 | Lewis et al. |
| 6,192,388 B1 | 2/2001 | Cajolet |
| 6,195,788 B1 | 2/2001 | Leaver et al. |
| 6,198,924 B1 | 3/2001 | Ishii et al. |
| 6,199,181 B1 | 3/2001 | Rechef et al. |
| 6,202,130 B1 | 3/2001 | Scales, III et al. |
| 6,202,189 B1 | 3/2001 | Hinedi et al. |
| 6,219,697 B1 | 4/2001 | Lawande et al. |
| 6,219,756 B1 | 4/2001 | Kasamizugami |
| 6,219,780 B1 | 4/2001 | Lipasti |
| 6,223,222 B1 | 4/2001 | Fijolek et al. |
| 6,226,387 B1 | 5/2001 | Tewfik et al. |
| 6,230,307 B1 | 5/2001 | Davis et al. |
| 6,237,029 B1 | 5/2001 | Master et al. |
| 6,246,883 B1 | 6/2001 | Lee |
| 6,247,125 B1 | 6/2001 | Noel-Baron et al. |
| 6,249,251 B1 | 6/2001 | Chang et al. |
| 6,258,725 B1 | 7/2001 | Lee et al. |
| 6,263,057 B1 | 7/2001 | Silverman |
| 6,266,760 B1 | 7/2001 | DeHon et al. |
| 6,272,579 B1 | 8/2001 | Lentz et al. |
| 6,272,616 B1 | 8/2001 | Fernando et al. |
| 6,279,020 B1 | 8/2001 | Dujardin et al. |
| 6,281,703 B1 | 8/2001 | Furuta et al. |
| 6,282,627 B1 | 8/2001 | Wong et al. |
| 6,286,134 B1 | 9/2001 | Click, Jr. et al. |
| 6,289,375 B1 | 9/2001 | Knight et al. |
| 6,289,434 B1 | 9/2001 | Roy |
| 6,289,488 B1 | 9/2001 | Dave et al. |
| 6,292,822 B1 | 9/2001 | Hardwick |
| 6,292,827 B1 | 9/2001 | Raz |
| 6,292,830 B1 | 9/2001 | Taylor et al. |
| 6,292,938 B1 | 9/2001 | Sarkar et al. |
| 6,301,653 B1 | 10/2001 | Mohamed et al. |
| 6,305,014 B1 | 10/2001 | Roediger et al. |
| 6,311,149 B1 | 10/2001 | Ryan et al. |
| 6,321,985 B1 | 11/2001 | Kolls |
| 6,326,806 B1 | 12/2001 | Fallside et al. |
| 6,346,824 B1 | 2/2002 | New |
| 6,347,346 B1 | 2/2002 | Taylor |
| 6,349,394 B1 | 2/2002 | Brock et al. |
| 6,353,841 B1 | 3/2002 | Marshall et al. |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 | 4/2002 | Collins et al. |
| 6,381,293 B1 | 4/2002 | Lee et al. |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,426,649 B1 | 7/2002 | Fu et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,446,258 B1 | 9/2002 | McKinsey et al. |
| 6,449,747 B2 | 9/2002 | Wuytack et al. |
| 6,456,996 B1 | 9/2002 | Crawford, Jr. et al. |
| 6,459,883 B2 | 10/2002 | Subramanian et al. |
| 6,467,009 B1 | 10/2002 | Winegarden et al. |
| 6,469,540 B2 | 10/2002 | Nakaya |
| 6,473,609 B1 | 10/2002 | Schwartz et al. |
| 6,483,343 B1 | 11/2002 | Faith et al. |
| 6,507,947 B1 | 1/2003 | Schreiber et al. |
| 6,510,138 B1 | 1/2003 | Pannell |
| 6,510,510 B1 | 1/2003 | Garde |
| 6,526,570 B1 | 2/2003 | Click, Jr. et al. |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 * | 6/2003 | Scheuermann ............... 375/222 |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,604,189 B1 | 8/2003 | Zemlyak et al. |
| 6,606,529 B1 | 8/2003 | Crowder, Jr. et al. |
| 6,611,906 B1 | 8/2003 | McAllister et al. |
| 6,615,333 B1 | 9/2003 | Hoogerbrugge et al. |
| 6,618,434 B2 | 9/2003 | Heidari-Bateni et al. |
| 6,618,777 B1 | 9/2003 | Greenfield |
| 6,640,304 B2 | 10/2003 | Ginter et al. |
| 6,647,429 B1 | 11/2003 | Semal |
| 6,653,859 B2 | 11/2003 | Sihlbom et al. |
| 6,675,265 B1 | 1/2004 | Barroso et al. |
| 6,675,284 B1 | 1/2004 | Warren |
| 6,684,319 B1 | 1/2004 | Mohamed et al. |
| 6,691,148 B1 | 2/2004 | Zinky et al. |
| 6,694,380 B1 | 2/2004 | Wolrich et al. |
| 6,711,617 B1 | 3/2004 | Bantz et al. |
| 6,718,182 B1 | 4/2004 | Kung |
| 6,718,541 B2 | 4/2004 | Ostanevich et al. |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,751,723 B1 | 6/2004 | Kundu et al. |
| 6,754,470 B2 | 6/2004 | Hendrickson et al. |
| 6,760,587 B2 | 7/2004 | Holtzman et al. |
| 6,760,833 B1 | 7/2004 | Dowling |
| 6,766,165 B2 | 7/2004 | Sharma et al. |
| 6,778,212 B1 | 8/2004 | Deng et al. |
| 6,785,341 B2 | 8/2004 | Walton et al. |
| 6,807,590 B1 | 10/2004 | Carlson et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,854,002 B2 | 2/2005 | Conway et al. |
| 6,859,434 B2 | 2/2005 | Segal et al. |
| 6,865,664 B2 | 3/2005 | Budrovic et al. |
| 6,871,236 B2 | 3/2005 | Fishman et al. |
| 6,883,074 B2 | 4/2005 | Lee et al. |
| 6,883,084 B1 | 4/2005 | Donohoe |
| 6,894,996 B2 | 5/2005 | Lee |
| 6,901,440 B1 | 5/2005 | Bimm et al. |
| 6,907,598 B2 | 6/2005 | Fraser |
| 6,912,515 B2 | 6/2005 | Jackson et al. |

| | | |
|---|---|---|
| 6,941,336 B1 | 9/2005 | Mar |
| 6,980,515 B1 | 12/2005 | Schunk et al. |
| 6,985,517 B2 | 1/2006 | Matsumoto et al. |
| 6,986,021 B2 | 1/2006 | Master et al. |
| 6,986,142 B1 | 1/2006 | Ehlig et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 | 11/2006 | Ainsworth et al. |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 | 3/2002 | Zakiya |
| 2002/0035623 A1 | 3/2002 | Lawande et al. |
| 2002/0041581 A1 | 4/2002 | Aramaki |
| 2002/0042875 A1 | 4/2002 | Shukla |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1* | 8/2002 | Bitterlich et al. ............ 455/552 |
| 2002/0120672 A1 | 8/2002 | Butt et al. |
| 2002/0133688 A1 | 9/2002 | Lee et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0167997 A1 | 11/2002 | Kim et al. |
| 2002/0168018 A1 | 11/2002 | Scheuermann |
| 2002/0181559 A1 | 12/2002 | Heidari-Bateni et al. |
| 2002/0184275 A1 | 12/2002 | Dutta et al. |
| 2002/0184291 A1 | 12/2002 | Hogenauer |
| 2002/0184498 A1 | 12/2002 | Qi |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023649 A1 | 1/2003 | Kamiya et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 | 4/2003 | Rao et al. |
| 2003/0074473 A1 | 4/2003 | Pham et al. |
| 2003/0076815 A1 | 4/2003 | Miller et al. |
| 2003/0099223 A1 | 5/2003 | Chang et al. |
| 2003/0102889 A1 | 6/2003 | Master et al. |
| 2003/0105949 A1 | 6/2003 | Master et al. |
| 2003/0110485 A1 | 6/2003 | Lu et al. |
| 2003/0131162 A1 | 7/2003 | Secatch et al. |
| 2003/0142818 A1 | 7/2003 | Raghunathan et al. |
| 2003/0154357 A1 | 8/2003 | Master et al. |
| 2003/0163723 A1 | 8/2003 | Kozuch et al. |
| 2003/0172138 A1 | 9/2003 | McCormack et al. |
| 2003/0172139 A1 | 9/2003 | Srinivasan et al. |
| 2003/0200538 A1 | 10/2003 | Ebeling et al. |
| 2003/0212684 A1 | 11/2003 | Meyer et al. |
| 2003/0229864 A1 | 12/2003 | Watkins |
| 2004/0006584 A1 | 1/2004 | Vandeweerd |
| 2004/0010645 A1 | 1/2004 | Scheuermann et al. |
| 2004/0015970 A1 | 1/2004 | Scheuermann |
| 2004/0025159 A1 | 2/2004 | Scheuermann et al. |
| 2004/0057505 A1 | 3/2004 | Valio |
| 2004/0062300 A1 | 4/2004 | McDonough et al. |
| 2004/0081248 A1 | 4/2004 | Parolari |
| 2004/0086027 A1 | 5/2004 | Shattil |
| 2004/0093479 A1 | 5/2004 | Ramchandran |
| 2004/0133745 A1 | 7/2004 | Ramchandran |
| 2004/0168044 A1 | 8/2004 | Ramchandran |
| 2004/0174932 A1 | 9/2004 | Warke et al. |
| 2005/0044344 A1 | 2/2005 | Stevens |
| 2005/0166038 A1 | 7/2005 | Wang et al. |
| 2005/0166073 A1 | 7/2005 | Lee |
| 2005/0190871 A1 | 9/2005 | Sedarat |
| 2005/0198199 A1 | 9/2005 | Dowling |
| 2006/0003757 A1* | 1/2006 | Subramanian et al. ...... 455/418 |
| 2006/0031660 A1 | 2/2006 | Master et al. |
| 2007/0168477 A1* | 7/2007 | Ralston et al. ............... 709/220 |

FOREIGN PATENT DOCUMENTS

| | | |
|---|---|---|
| EP | 0 301 169 A1 | 2/1989 |
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |

| | | | |
|---|---|---|---|
| WO | WO 93/13603 A1 | 7/1993 |
| WO | WO 95/11855 A1 | 5/1995 |
| WO | WO 96/33558 A1 | 10/1996 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 10/2001 |
| WO | WO 02/12978 A2 | 2/2002 |

OTHER PUBLICATIONS

Aggarwal et al.., "Efficient Huffman Decoding," International Conference on Image Processing IEEE 1:936-939 (Sep. 10-13, 2000).
Allan et al., "Software Pipelining," ACM Computing Surveys, 27(3):1-78 (Sep. 1995).
Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).
Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).
Bacon et al., "Compiler Transformations for High-Performance Computing," ACM Computing Surveys 26(4):368-373 (Dec. 1994).
Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).
Banerjee et al., "A MATLAB Compiler for Distributed, Heterogeneous, Reconfigurable Computing Systems," 2000 IEEE Symposium, pp. 39-48, (Apr. 17-19, 2000).
Bapte et al., "Uniform Execution Environment for Dynamic Reconfiguration," Darpa Adaptive Computing Systems, http://isis.vanderbilt.edu/publications/archive/babty_T_#_0_1999_Uniform_Ex.pdf, pp. 1-7 (1999).
Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).
Becker et al., "An Application-Tailored Dynamically Reconfigurable Hardware Architecture for Digital Baseband Processing," IEEE Conference Proceedings Article pp. 341-346 (Sep. 18, 2000).
Becker et al., "Design and Implementation of a Coarse-Grained Dynamically Reconfigurable Hardware Architecture," VLSI 2001, Proceedings IEEE Computer Soc. Workshop, Piscataway, NJ, USA, pp. 41-46 (Apr. 19-20, 2001).
BevStar, BevStar Bottled Water Model Advertisement *Automatic Merchandiser* at www.AMonline.com (2005).
BevStar, BevStar Point of Use Water Model Advertisement *Automatic Merchandiser* at www.AMonline.com (2005).
Bishop & Loucks, "A Heterogeneous Environment for Hardware/Software Cosimulation," Proceedings of the 30th Annual Simulation Symposium, pp. 14-22 (Apr. 7-9, 1997).
Brakensiek et al., "Re-Configurable Multi-Standard Terminal for Heterogeneous Networks," Radio and Wireless Conference, Rawcon 2002 IEEE. pp. 27-30 (2002).
Brown et al., "Quick PDA Data Exchange," PC Magazine pp. 1-3 (May 22, 2001).
Buck et al., "Ptolemy: A Framework for Simulating and Prototyping Heterogeneous Systems," International Journal of Computer Simulation 4:155-182 (Apr. 1994).
Burns et al., "A Dynamic Reconfiguration Run-Time System," Proceedings of the 5th Annual Symposium on Field-Programmable Custom Computing Machines, pp. 1 66-75 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).
Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).
Callahan et al., "Adapting Software Pipelining for Reconfigurable Computing," in Proceedings of the International Conference on Compilers, Architectrue and Synthesis for Embedded Systems p. 8, ACM (CASES '00, San Jose, CA) (Nov. 17-18, 2000).
Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).
Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).
Clarke, "Embedded Solutions Enters Development Pact with Marconi," EETimes Online (Jan. 26, 2000).
Compton & Hauck, "Reconfigurable Computing: A Survey of Systems and Software," ACM Press, ACM Computing Surveys (CSUR) 34(2):171-210 (Jun. 2002).
Compton et al., "Configuration Relocation and Defragmentation for Run-Time Reconfigurable Computing," Northwestern University, http://citeseer.nj.nec.com/compton00configuration.html, pp. 1-17 (2000).
Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).
Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).
Cray Research Inc., "Cray T3E Fortran Optimization Guide," Ver. 004-2518-002, Section 4.5 (Jan. 1999).
Cummings et al., "FPGA in the Software Radio," IEEE Communications Magazine . 37(2):108-112 (Feb. 1999).
Dandalis et al., "An Adaptive Cryptograhic Engine for IPSec Architectures," IEEE pp. 132-141 (Jan. 2000).
David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).
Deepakumara et al., "FPGA Implementation of MD5 has Algorithm," Canadian Conference on Electrical and Computer Engineering, IEEE (2001).
Dehon et al., "Reconfigurable Computing: What, Why and Implications for Design Automation," Design Automation Conference Proceedings pp. 610-615 (1999).
Dipert, "Figuring Out Reconfigurable Logic," EDN 44(16):107-114 (Aug. 5, 1999).
Dominikus, "A Hardware Implementation of MD4-Family Hash Algorithms," 9th International Conference on Electronics, Circuits and Systems IEEE (2002).
Dorband, "aCe C Language Reference Guide," Online (Archived Mar. 2001), http://web.archive.org/web/20000616053819/http://newton.gsfc.nasa.gov/ aCe/aCe_dir/aCe_cc_Ref.html (Mar. 2001).
Drozdowski, "Scheduling Multiprocessor Tasks—An Overview," Instytut Informatyki Politechnika, pp. 1-31 (Jan. 31, 1996).
Ebeling et al., "RaPiD Reconfigurable Pipelined Datapath," Springer-Verlag, 6th International Workshop on Field-Programmable Logic and Applications pp. 126-135 (1996).
Fawer et al., "A Multiprocessor Approach for Implementing a Time-Diversity Spread Specturm Receiver," Proceeding sof the 1990 International Zurich Seminal on Digital Communications, pp. 173-180 (Mar. 5-8, 1990).
Fisher, "Gone Flat," Forbes pp. 76-79 (Oct. 2001).
Fleischmann et al., "Prototyping Networked Embedded Systems," Integrated Engineering, pp. 116-119 (Feb. 1999).

Forbes "Best of the Web—Computer Networking/Consumer Durables," *The Forbes Magnetic 40* p. 80 (May 2001).
Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).
Gluth, "Integrierte Signalprozessoren," Elektronik 35(18):112-118 Franzis Verlag GMBH, Munich, Germany (Sep. 5, 1986).
Gokhale & Schlesinger, "A Data Parallel C and Its Platforms," Proceedings of the Fifth Symposium on the Frontiers of Massively Parallel Computation pp. 194-202 (Frontiers '95) (Feb. 1995).
Grimm et al., "A System Architecture for Pervasive Computing," Washington University, pp. 1-6 (Sep. 2000).
Halbwachs et al., "The Synchronous Data Flow Programming Language LUSTRE," Proceedings of the IEEE 79(9):1305-1319 (Sep. 1991).
Hammes et al., "Cameron: High Level Language Compilation for Reconfigurable Systems," Proc. of the Intl. Conf. on Parallel Architectures and Compilation Techniques, pp. 236-244 (Oct. 1999).
Hartenstein, "Coarse Grain Reconfigurable Architectures," Design Automation Conference, 2001. Proceedings of the ASP-Dac 2001, Asian and South Pacific Jan. 30, 2001- Feb. 2, 2001, Piscataway, NJ, US, IEEE, pp. 564-569 (Jan. 30, 2001).
Heinz, "An Efficiently Compilable Extension of {M} odula-3 for Problem-Oriented Explicitly Parallel Programming," Proceedings of the Joint Symposium on Parallel Processing (May 1993).
Hinden et al., "The DARPA Internet: Interconnecting Heterogeneous Computer Networks with Gateways," IEEE Computer Magazine pp. 38-48 (1983).
Horton, "Beginning Java 2: JDK 1.3 Edition," Wrox Press, Chapter 8, pp. 313-316 (Feb. 2001).
Huff et al., "Lifetime-Sensitive Modulo Scheduling," 6th Conference on Programming Language, Design and Implementation, pp. 258-267, ACM (1993).
IBM, "Multisequencing a Single Instruction Stream Scheduling with Space-time Trade-offs," IBM Technical Disclosure Bulletin 36(2):105-108 (Feb. 1, 1993).
IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).
Internet Wire, Sunbeam Joins Microsoft in University Plug and Play Forum to Establish A "Universal" Smart Appliance Technology Standard (Mar. 23, 2000).
Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).
Isoworth, "Isoworth Beverage Dispensing Technology Worldwide Company," Brochure (May 22, 2000).
Jain et al., "An Alternative Approach Towards the Design of Control Units," Microelectronics and Reliability 24(6):1009-1012 (1984).
Jain, "Parallel Processing with the TMS320C40 Parallel Digital Signal Processor," Sonitech International Inc., pp. 13-46. Retrieved from: http://www-s.ti.com/sc/psheets/spra031/spra031.pdf retrieved on Apr. 14, 2004 (Feb. 1994).
Janssen et al., "Partitioned Register File for TTAs," Proceedings of the 28th Annual International Symposium on Microarchitecture, pp. 303-312 (Nov. 1995).
Jong-Pyng et al., "Real-Time Virtual Channel Flow Control," Proceedings of the Annual International Phoenix Conference on Computers and Communications, Conf. 13, pp. 97-103 (Apr. 12, 1994).
Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).
Kaufmann et al., "Digital Spread-Spectrum Multipath-Diversity Receiver for Indoor Communication," from Pioneers to the 21st Century; Denver, Proceedings of the Vehicular Technology Socity [sic] Conference, NY, IEEE, US 2(Conf. 42):1038-1041 (May 10-13, 1992).
Kneip et al., "An Algorithm Adapted Autonomous Controlling Concept for a Parallel Single-Chip Digital Signal Processor," Journal of VLSI Signal Processing Systems for Signal, Image, an dVideo Technology 16(1):31-40 (May 1, 1997).
Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).
Lee & Messerschmitt, "Synchronous Data Flow," Proceedings of the IEEE 75(9):1235-1245 (Sep. 1987).
Lee & Parks, "Dataflow Process Networks," Proceedings of the IEEE 83(5):773-799 (May 1995).
Liu et al., "Scheduling Algorithms for Multiprogramming in a Hard-Real-Time Environment," *Journal of the Association for Computing* 20(1):46-61 (1973).
Llosa et al., "Lifetime-Sensitive Modulo Scheduling in a Production Environment," IEEE Trans. on Comps. 50(3):234-249 (Mar. 2001).
Lu et al., "The Morphosys Dynamically Reconfigurable System-On-Chip," Proceedings of the First NASA/DOD Workshop on Evolvable Hardware, pp. 152-160 (Jul. 19, 1999).
Mangione-Smith et al., "Seeking Solutions in Configurable Computing," *Computer* 30(12):38-43 (Dec. 1997).
Manion, "Network CPU Adds Spice," Electronic Engineering Times, Issue 1126 (Aug. 14, 2000).
Mascia & Ishii., "Neural Net Implementation on Single-Chip Digital Signal Processor," IEEE (1989).
McGraw, "Parallel Functional Programming in Sisal: Fictions, Facts, and Future," Lawrence Livermore National Laboratory pp. 1-40 (Jul. 1993).
Najjar et al., "High-Level Language Abstraction for Reconfigurable Computing," *Computer* 36(8):63-69 (Aug. 2003).
Nichols et al., "Data Management and Control-Flow Constructs in a SIMD/SPMD Parallel Language/Compiler," Proceedings of the 3rd Symposium on the Frontiers of Massively Parallel Computation pp. 397-406 (Oct. 1990).
OpenMP Architecture Review Board, "OpenMP C and C++ Application Program Interface," pp. 7-16 (Oct. 1998).
Oracle Corporation, "Oracle8i JDBC Developer's Guide and Reference," Release 3, 8.1.7, pp. 10-8-10-10 (Jul. 2000).
Pauer et al., "Algorithm Analysis and Mapping Environment for Adaptive Computing Systems: Further Results," Proc. IEEE Symposium on FPGA's for Custom Computing Machines (FCCM), Napa CA (1999).
Pauer et al., "Algorithm Analysis and Mapping Environment for Adaptive Computing Systems," Presentation slides, Third Bi-annual Ptolemy Miniconference (1999).
Ramamritham et al., "On Scheduling Algorithms for Real-Time Multiprocessor Systems," Algorithms and Applications, Proceedings of the International conference on Parallel Processing 3:143-152 (Aug. 8, 1989).
Schneider, "A Parallel/Serial Trade-Off Methodology for Look-Up Table Based Decoders," Proceedings of the Design Automation Conference 34:498-503 (Jun. 9-13, 1997).
Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu_fp100.pdf/sidhu00selfreconfigurable.pdf retrieved on Jun. 21, 2001 (Sep. 1, 2001).
Smith, "Intro to ASICs: ASIC Cell Libraries," at http://iroi.seu.edu.cn/books/asics/Book2/CH01/CH01.5.htm, printed on Feb. 4, 2005 (Jun. 1997).
Souza, "Computing's New Face—Reconfigurable Devices Could Rattle Supply Chain," Electronic Buyers' News Issue 1205, p. P.1 (Apr. 3, 2000).
Souza, "Quicksilver Buys White Eagle," Electronic Buyers News, Issue 1220 (Jul. 17, 2000).
Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).
Steiner, "Coke Chief's Latest Daft Idea—A Cola Tap in Every House," Sunday Times (Mar. 2001).

Sun Microsystems, "FORTRAN 3.0.1 User's Guide, Revision A," pp. 57-68 (Aug. 1994).

Svensson, "Co's Join on Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBO: A Reconfigurable Architecture for Ubiquitous Wireless Networks," A Thesis Submitted in Partial Fulfillment of the Requirements for the Degree Master of Science; Rice University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

'WWW.BESTROM.COM, BreakMateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, Isoworth Beverage Dispensing Technology Worldwide from www.bevstar.com printed on Apr. 30, 2008.

WWW.BONATOR.COM, from The World Wide Web at http://web.archive.org/web/20000510102440/http://www.bonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page. (Mar. 3, 2000).

WWW.ICL.COM, from the World Wide Web at http://www.icl.com printed on Apr. 30, 2008.

WWW.MARGHERITA2000.COM; from Margherita2000.com printed Apr. 30, 2008 (Jan. 26, 2001).

WWW.SODACLUBENTERPRISES.COM, Soda-Club Enterprises from www.sodaclubenterprises.com printed on Apr. 30, 2008.

WWW.SYMBOL.COM, Symbol from www.symbol.com printed on Apr. 30, 2008.

WWW.WUNDERBAR.COM, Wunder-Bar Dispensing Systems from www.wunderbar.com printed on Apr. 30, 2008.

XILINX, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A 1V Heterogeneous Reconfigurable Processor IC for Baseband Wireless Applications," 2000 IEEE Solid.

Adl-Tabatabai et al., "Code Reuse in an Optimizing Compiler," OOPSLA, ACM pp. 51-68 (1996).

Altera Apex 20K 1999.

Andraka Consulting Group, "Distributed Arithmetic," Obtained from: http://www.fpga-guru.com/distribu.htm (1998-2000).

Bickerstaff et al., "A Unified Turbo/Viterbi Channel Decoder for 3GPP Mobile Wireless in 0.18µ CMOS," IEEE *Journal of Solid-State Circuits* 37(11):1555-62 (2002).

Bogdan et al., "Power Reduction Techniques for a Viterbi Decoder Implementation,", (Jul. 2000).

Chang et al., "Low-Power Bit-Serial Viterbi Decoder for Next Generation Wide-Band CDMA Systems,", (Mar. 1999).

Clark et al., "Error Correction Coding for Digital Communications," Plenum Press NY (1981).

Computer Organization and Design $2^{nd}$ Edition, Hennessy, Morgan Kaufmann Publishers, pp. 569-570 (1998).

Free On-Line Dictionary of Computing. © 1995-2000 www.foldoc.org search terms: cache, operating system, Internet, DMA, interrupt.

Garrett et al, "Low Power Architecture of the Soft-Output Viterbi Algorithm,", (Aug. 1998).

Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sep. 2001).

Hekstra, "An Alternative to Metric Rescaling in Viterbi Decoders," IEEE Transactions on Communications vol. 37 No. 11 (Nov. 1989).

Hendrix, "Viterbi Decoding Techniques in the TMS320C54x Family," Texas Instruments Application Note (Jun. 1996).

Janweijer et al., "A Compact Robin Using the SHarc (CRUSH)," Obtained from: http://www.nikhef.nl/~peterj/Crush/CRUSH-hw.pdf (Sep. 1998).

Matache et al., "Trellis Coding for Diagonally Layered Space-Time Systems,", (May 2002).

Paaske et al., "High Speed Viterbi Decoder Architecture," First ESA Workshop on Tracking, Telemetry and Command Systems, ESTEC (Jun. 1998).

Rajagopalan et al., "A Flexible Multiplication Unit for an FPGA Logic Block," *Circuits and Systems* 4:546-9 (2001).

Xilinx Data Book 1998.

Xilinx Virtex 1.1 1998.

Xilinx Virtex 2.2 2000.

Yeo et al., "Implementation of High Throughput Soft Output Viterbi Decoders," Proc. IEEE Workshop on Signal Processing Systems pp. 146-151 San Diego CA (Oct. 2002).

Office Action mailed Jun. 19, 2002 for U.S. Appl. No. 09/851,543.

\* cited by examiner

| Shift Code | Function | 7 | 6 | 5 | 4 | 3 | 2 | 1 | 0 |
|---|---|---|---|---|---|---|---|---|---|
| 0000 | Zero | 0 | 0 | 0 | 0 | 0 | 0 | 0 | 0 |
| 0001 | Left 1 | i6 | i5 | i4 | i3 | i2 | i1 | i0 | 0 |
| 0010 | Left 2 | i5 | i4 | i3 | i2 | i1 | i0 | 0 | 0 |
| 0011 | Left 3 | i4 | i3 | i2 | i1 | i0 | 0 | 0 | 0 |
| 0100 | Left 4 | i3 | i2 | i1 | i0 | 0 | 0 | 0 | 0 |
| 0101 | Left 5 | i2 | i1 | i0 | 0 | 0 | 0 | 0 | 0 |
| 0110 | Left 6 | i1 | i0 | 0 | 0 | 0 | 0 | 0 | 0 |
| 0111 | Left 7 | i0 | 0 | 0 | 0 | 0 | 0 | 0 | 0 |
| 1000 | Pass | i7 | i6 | i5 | i4 | i3 | i2 | i1 | i0 |
| 1001 | Right 1 | 0 | i7 | i6 | i5 | i4 | i3 | i2 | i1 |
| 1010 | Right 2 | 0 | 0 | i7 | i6 | i5 | i4 | i3 | i2 |
| 1011 | Right 3 | 0 | 0 | 0 | i7 | i6 | i5 | i4 | i3 |
| 1100 | Right 4 | 0 | 0 | 0 | 0 | i7 | i6 | i5 | i4 |
| 1101 | Right 5 | 0 | 0 | 0 | 0 | 0 | i7 | i6 | i5 |
| 1110 | Right 6 | 0 | 0 | 0 | 0 | 0 | 0 | i7 | i6 |
| 1111 | Right 7 | 0 | 0 | 0 | 0 | 0 | 0 | 0 | i7 |

Legend: i[7:0] are the shifter's eight input bits.
i7 is the msb; i0 is the lsb.

METHOD AND SYSTEM FOR RECONFIGURABLE CHANNEL CODING

CROSS-REFERENCE TO RELATED APPLICATIONS

This application is a continuation of U.S. patent application Ser. No. 09/851,543, filed on May 8, 2001, now U.S. Pat. No. 6,577,678.

FIELD OF THE INVENTION

The present invention relates, in general, to channel coding operations, and more particularly to reconfigurable channel coding operations to accommodate various wireless communication standards.

BACKGROUND OF THE INVENTION

The use of cellular telephones in today's society has become widespread. While facilitating communication in a myriad of environments, the various existing and emerging wireless standards inhibit the ability to utilize a single device across the standards and platforms. The inability to have cross-platform coverage in a single device is due in large part to the inability to provide a hardware solution that can be adapted to varying standards.

For example, in terms of the channel coding operations that are necessary, existing and emerging wireless standards utilize myriad error mitigation techniques to operate in a hostile channel environment. Existing standards utilize two levels of coding plus block interleaving to address both single error and burst error phenomena. Group codes are used for the outer codes, and convolutional codes are used for the inner codes of the various concatenated coding schemes. No two standards employ the same combination. Additionally, certain standards employ encryption to offer a degree of privacy and security.

Utilization of an ASIC (application specific integrated circuit) approach for channel coding would be inefficient in such an environment, since there would need to have individual ASICs for supporting each possible standard. In addition, there would be an ongoing requirement to support modifications from an original design without the ability of having new silicon. A RISC (reduced instruction set computing) option is inefficient for the bit-oriented operations required for channel coding. Similarly, a DSP (digital signal processing) approach is also ill-suited to the bit-oriented requirements of channel coding. Use of a microprogrammed approach provides an arcane nature of programming and maintaining that precludes serious consideration as a solution. While FPGAs (field programmable gate arrays) do provide flexibility, the high costs, both in transistor count and control overhead, outweigh their benefits.

Accordingly, a need exists for a channel coding approach that allows convenient, efficient, and effective support across multiple standards. The present invention addresses such a need.

SUMMARY OF THE INVENTION

Aspects of a reconfigurable system for providing channel coding in a wireless communication device are described. The aspects include a plurality of computation elements for performing channel coding operations and memory for storing programs to direct each of the plurality of computation elements. A controller controls the plurality of computation elements and stored programs to achieve channel coding operations in accordance with a plurality of wireless communication standards. The plurality of computation elements include a data reordering element, a linear feedback shift register (LFSR) element, a convolutional encoder element, and a Viterbi decoder element.

With the present invention, a reconfigurable channel coder is provided that minimizes point designs, i.e., the present invention avoids designs that satisfy a singular requirement of one, and only one, wireless standard, which would render them useless for any other function. Further, bit-oriented operations of channel coding are successfully mapped onto a set of byte-oriented memory and processing elements. In addition, the present invention achieves a channel coder in a manner that provides realizability, reliability, programmability, maintainability, and understand-ability of design, while gaining savings in power and die area. Numerous other advantages and features of the present invention will become readily apparent from the following detailed description of the invention and the embodiments thereof, from the claims and from the accompanying drawings.

DETAILED DESCRIPTION OF THE INVENTION

Figure 1:
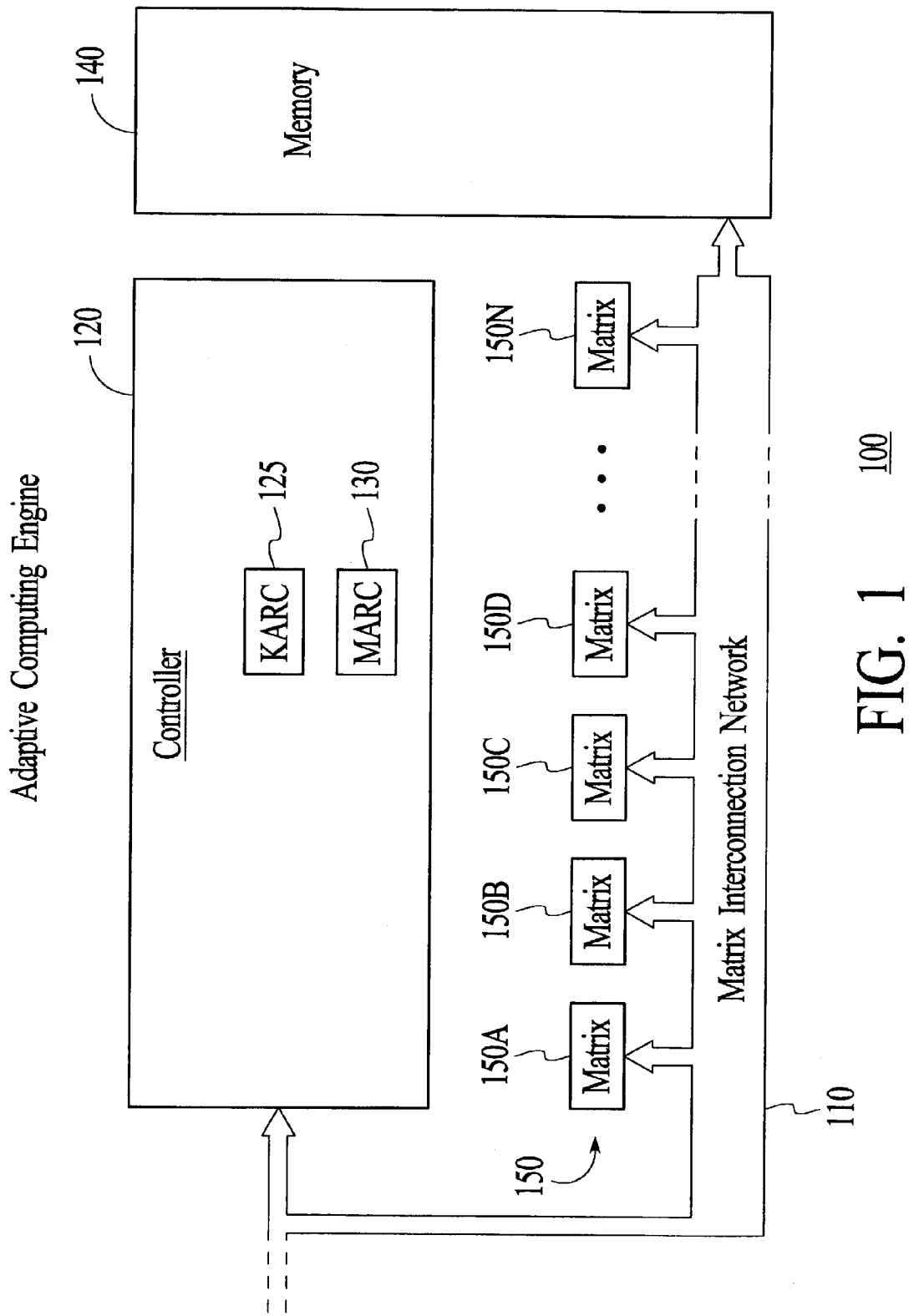
FIG. 1 is a block diagram illustrating an adaptive computing engine.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

The present invention provides aspects of a reconfigurable channel coder. In a preferred embodiment, the reconfigurable channel coder is provided as a reconfigurable matrix in accordance with the description in co-pending U.S. patent application Ser. No. 09/815,122, entitled "Adaptive Integrated Circuitry with Heterogeneous and Reconfigurable Matrices of Diverse and Adaptive Computational Units Having Fixed, Application Specific Computational Elements", assigned to the assignee of the present invention and incorporated by reference in its entirety herein. Portions of that description are reproduced herein for clarity of presentation of the aspects of the present invention.

Referring to FIG. 1, a block diagram illustrates an adaptive computing engine ("ACE") 100, which is preferably embodied as an integrated circuit, or as a portion of an integrated circuit having other, additional components. In the preferred embodiment, and as discussed in greater detail below, the ACE 100 includes a controller 120, one or more reconfigurable matrices 150, such as matrices 150A through 150N as illustrated, a matrix interconnection network 110, and preferably also includes a memory 140.

A significant departure from the prior art, the ACE 100 does not utilize traditional (and typically separate) data and instruction busses for signaling and other transmission between and among the reconfigurable matrices 150, the controller 120, and the memory 140, or for other input/output ("I/O") functionality. Rather, data, control and configuration information are transmitted between and among these elements, utilizing the matrix interconnection network 110, which may be configured and reconfigured, in real-time, to provide any given connection between and among the reconfigurable matrices 150, the controller 120 and the memory 140, as discussed in greater detail below.

The memory 140 may be implemented in any desired or preferred way as known in the art, and may be included within the ACE 100 or incorporated within another IC or portion of an IC. In the preferred embodiment, the memory 140 is included within the ACE 100, and preferably is a low power consumption random access memory (RAM), but also may be any other form of memory, such as flash, DRAM, SRAM, MRAM, ROM, EPROM or $E^2$PROM. In the preferred embodiment, the memory 140 preferably includes direct memory access (DMA) engines, not separately illustrated.

The controller 120 is preferably implemented as a reduced instruction set ("RISC") processor, controller or other device or IC capable of performing the two types of functionality discussed below. The first control functionality, referred to as "kernal" control, is illustrated as kernal controller ("KARC") 125, and the second control functionality, referred to as "matrix" control, is illustrated as matrix controller ("MARC") 130.

The various matrices 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of computation units (200, FIG. 2), which in turn generally contain a different or varied mix of fixed, application specific computational elements (250, FIG. 2), which may be connected, configured and reconfigured in various ways to perform varied functions, through the interconnection networks. In addition to varied internal configurations and reconfigurations, the various matrices 150 may be connected, configured and reconfigured at a higher level, with respect to each of the other matrices 150, through the matrix interconnection network 110.

Figure 2:
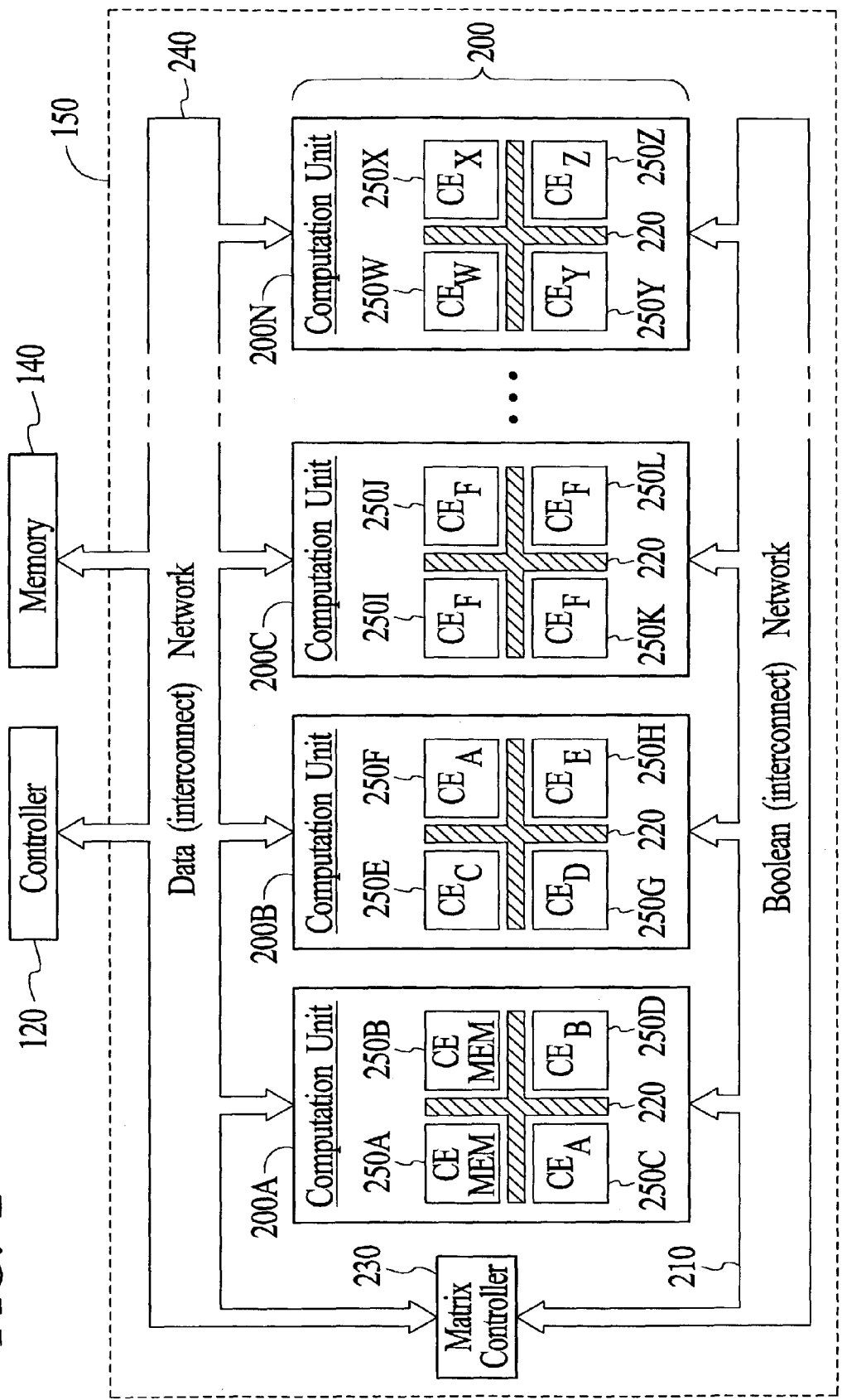
FIG. 2 is a block diagram illustrating a reconfigurable matrix, a plurality of computation units, and a plurality of computational elements of the adaptive computing engine.

Referring now to FIG. 2, a block diagram illustrates, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 2, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The Boolean interconnect network 210, as mentioned above, provides the reconfigurable interconnection capability between and among the various computation units 200, while the data interconnect network 240 provides the reconfigurable interconnection capability for data input and output between and among the various computation units 200. It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 2, included within a computation unit 200 are a plurality of computational elements 250, illustrated as computational elements 250A through 250Z (collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. The fixed computational elements 250 may be reconfigurably connected together to execute an algorithm or other function, at any given time, utilizing the interconnect 220, the Boolean network 210, and the matrix interconnection network 110.

In the preferred embodiment, the various computational elements 250 are designed and grouped together, into the various reconfigurable computation units 200. In addition to computational elements 250 which are designed to execute a particular algorithm or function, such as multiplication, other types of computational elements 250 may also be utilized. As illustrated in FIG. 2, computational elements 250A and 250B implement memory, to provide local memory elements for any given calculation or processing function (compared to the more "remote" memory 140). In addition, computational elements 250I, 250J, 250K and 250L are configured (using, for example, a plurality of flip-flops) to implement finite state machines, to provide local processing capability (compared to the more "remote" MARC 130), especially suitable for complicated control processing.

In the preferred embodiment, a matrix controller 230 is also included within any given matrix 150, to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 2, particularly useful for complicated control sequences, dynamic scheduling, and input/output management, while a fourth type may implement memory and memory management, such as computation unit 200A. Lastly, a fifth type of computation unit 200 may be included to perform bit-level manipulation.

Figure 3:
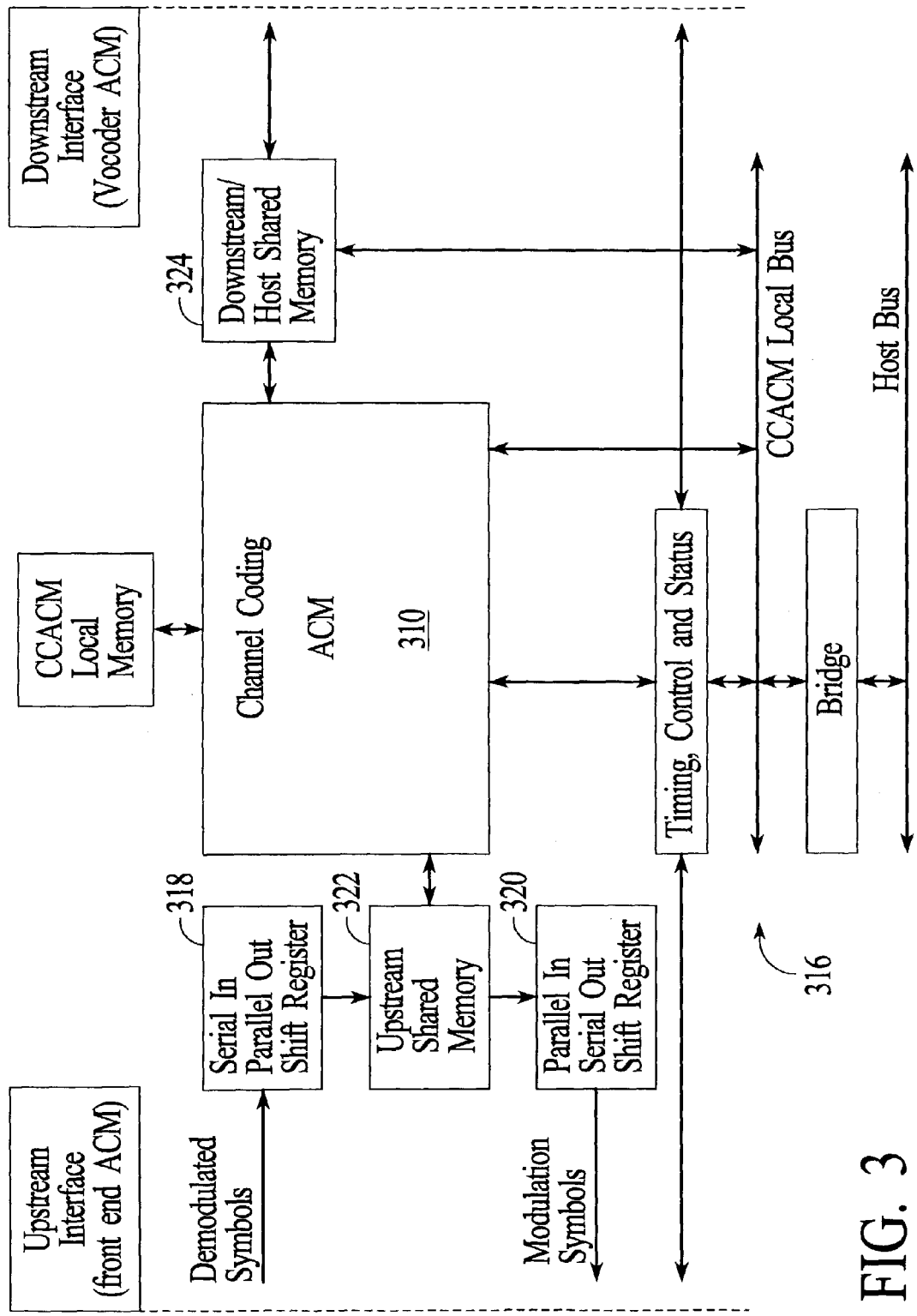
FIG. 3 illustrates a block diagram of a channel coding computation unit in accordance with the present invention.

The operations of channel coding fall within this fifth category type for computation unit 200. An overall diagram of a channel coding computation unit in accordance with the present invention that performs across standards in a flexible and reliable manner is shown in FIG. 3. The channel coding computation unit/channel coder 310 includes a plurality of configurable and/or programmable memory and processing elements and has three principle interfaces: a front end or upstream interface 312, a Vocoder or downstream interface 314, and a host interface 316. The channel coder 310 receives demodulated symbols from the RECEIVE segment of the upstream interface 312 via the shift register 318 and sends modulation symbols to the TRANSMIT segment of the upstream interface 312 via the shift register 320. Upstream shared memory 322 and downstream shared memory 324 provide ping/pong pairs of buffer memories for the data interfaces. Data blocks are transferred at a fixed rate, e.g., one block in each direction every 20 milliseconds.

For example, for the receive path, during one 20 millisecond interval, data from the front-end interface 312 is written into the receive PING buffer memory and data in the receive PONG buffer memory is processed by the channel coder 310. During the next 20 millisecond interval, data from the front-end interface 312 is written into the receive PONG buffer memory and data in the receive PING buffer memory is processed by the channel coder 310, and so on. A pair of control signals synchronizes these operations, where one indicates the beginning of each interval and the other indicates the ping/pong state. These operations are performed similarly with a second pair of buffer memories used in the transmit path.

The channel coder 310 sends speech blocks to a vocoder decoder (not shown) and receives speech blocks from a vocoder encoder (not shown) via the downstream interface 314. Again, ping/pong buffers are utilized for the transmit and receive operations via the downstream interface 314 with memory 324. Thus, for example, during one 20 millisecond interval, data from the channel coder 310 is written into a PING buffer memory and data in the PONG buffer memory is processed by the vocoder decoder. During the next 20-millisecond interval, data from the channel coder 310 is written into the PONG buffer memory and data in the PING buffer memory is processed by the vocoder decoder, and so on. Three control signals synchronizes these operations, where one indicates the beginning of each interval, a second indicates the ping/pong state, and a third indicates valid/corrupted data for the receive path only. These operations are performed similarly with a second pair of buffer memories used for the data interface between the channel coder and vocoder encoder. Continuing to refer to FIG. 3, there are several interfaces between the host controller 120 and channel coder 310 that provide the host interface 316. One supports the configuration of the channel coder 310 and another is used for control and status. The third, denoted as downstream/host shared memory 324, provides bi-directional message transfer between the channel coder's 310 physical layer and the higher protocol layers executing on the host controller 120.

For many of the channel coding operations of channel coder 310, reordering and/or randomly accessing the bits that comprise a data block are required. For example, for the GSM standard, 260 bit blocks of data are generated by the speech encoder every 20 milliseconds. These bits are manipulated three different ways before they are transmitted, as is well understood in the art. First, the most perceptually significant 50 bits from each 260-bit block must be accessed in a nearly random fashion and input to a CRC generator. Next, 182 bits from the 260 bit block, the 3 CRC bits, and four tail bits are reordered for input to a R=½ convolutional encoder. Finally, the remaining least perceptually significant 78 bits from the 260 bit block and the 378 bits from the R=½ convolutional encoder are reordered into eight 57-bit blocks, employing an interleaving algorithm for burst error mitigation.

Each of the other standards also requires data reordering operations, but the implementation details vary widely. Two general classes of reordering are required. One class can be described algorithmically, while a second class basically requires random access capability. An interleaver is an example of the former, and bit picking from the encoded speed blocks is an example of the latter. In order to achieve both classes of reordering while avoiding point solutions, the channel coder 310 of the present invention employs a look-up table approach, as described with reference to FIG. 4.

Figure 4:
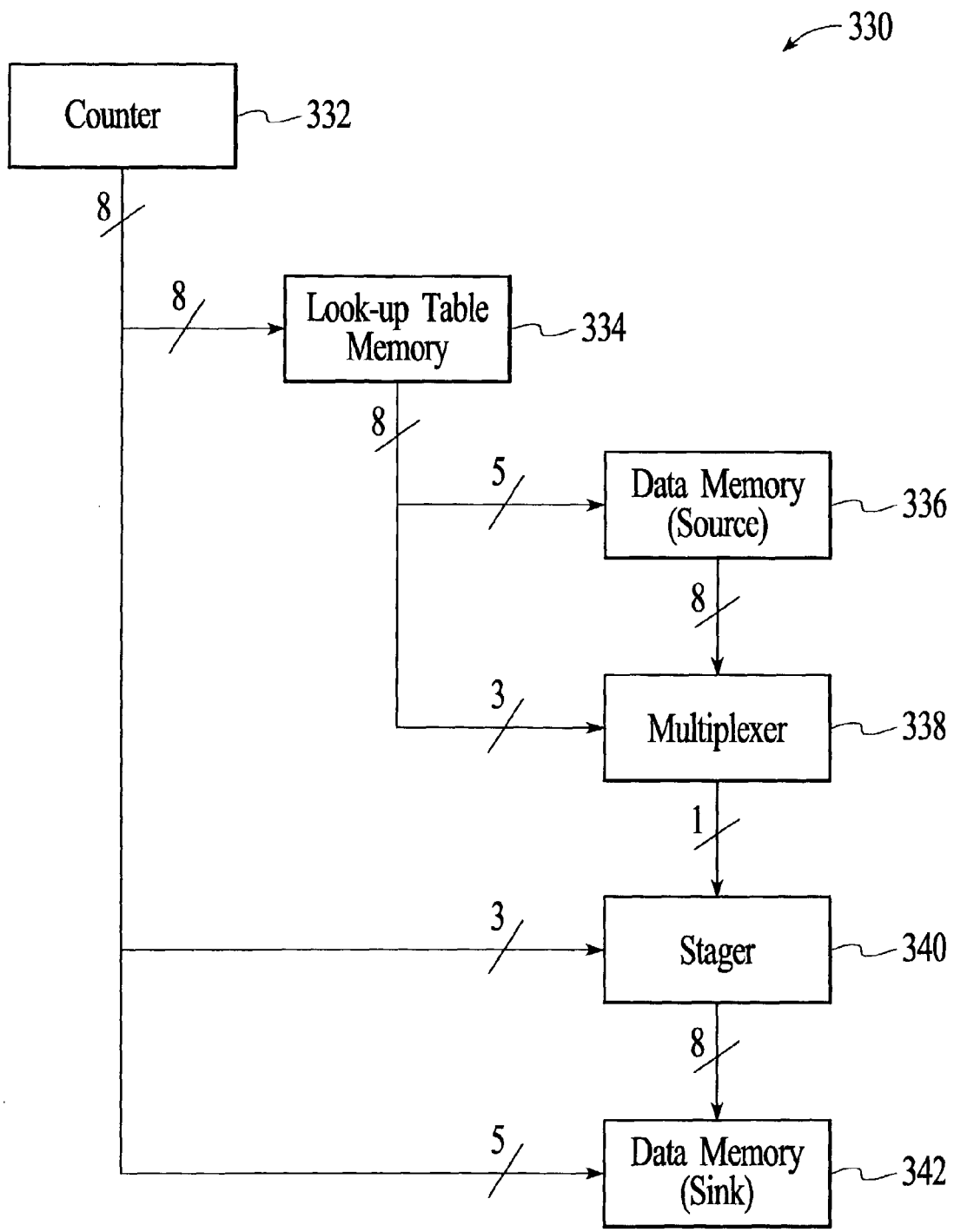
FIGS. 4-8 each illustrate aspects of computation elements of the channel coding computation unit of FIG. 3 in accordance with the present invention.

FIG. 4 illustrates an example of a reordering element 330 as a computation element of the channel coder 310 in accordance with the present invention. The byte-wide organization supports arbitrary reordering of 256-bit data blocks. In operation, an up counter 332 is incremented from 0 to N−1, where N represents the length of the data vector. For this example, Nmax is 256. For each count, the look-up table memory 334 outputs an encoded byte that contains the location of the desired bit in the 32-byte source data memory 336. Five bits specify the byte memory address and three bits indicate the desired 1-of-8 data bits from multiplexer 338. The desired bit is stored in the stager 340, e.g., an 8-bit serial-in, parallel-out shift register. The staged bytes are written sequentially into the 32-byte sink data memory 342.

Of course, the reordering element 330 also supports random access operations. For example, the GSM standard requires the random access of 50 bits of encoded speech deemed most perceptually significant for the purpose of generating CRC protection. For random access operations, however, data is not moved from a source memory 336 to a sink memory 342. Thus, only the top four blocks 332, 334, 336, and 338 are required.

While the reordering element 330 has been described in terms of 256-bit data block size, in order to handle data blocks larger than 256 bits, the look-up table width has to be greater than eight bits. An extension of the look-up table memory width would accommodate a greater width. Alternatively, two bytes could be processed per bit.

In addition to reordering data, channel coding schemes normally include error detecting cyclic codes, error detecting and correcting Hamming codes, single burst error correcting Fire codes, and so on. Typically, these codes are represented by their generator polynomials. The degree of polynomials used for the various wireless standards spans a wide range, from degree 3 for a GSM CRC, to degree 42 for the CDMA long code, to effective degrees of 64 and 128 for the GSM and Bluetooth ciphers, respectively. While separate encoders and decoders can be implemented for each of these standards utilizing linear feedback shift registers (LFSRs), the channel coder 310 implements a programmable special purpose computational element to perform the operations of a LFSR that accommodates the various standards as needed. Normally, LSFRs are bit-oriented structures which combine shift register stages and mod-2 adders. The present invention provides a programmable, byte-oriented structure, as represented in the block diagram of FIG. 5.

By way of example, the generator polynomial used for GSM (224, 184) Fire code is $g(x)=x^{40}+x^{26}+x^{23}+x^{17}+x^{3}+1$. A block of 184 bits is protected by 40 extra parity bits used for error detection and correction. These bits are appended to the 184 bits to form a 224 bit sequence. In order to map bit-oriented encoder operations onto the byte-oriented LFSR element of the present invention, the processing of eight information bits at one time and the computing the LFSR state after eight consecutive shifts are required.

Figures 5, 6:
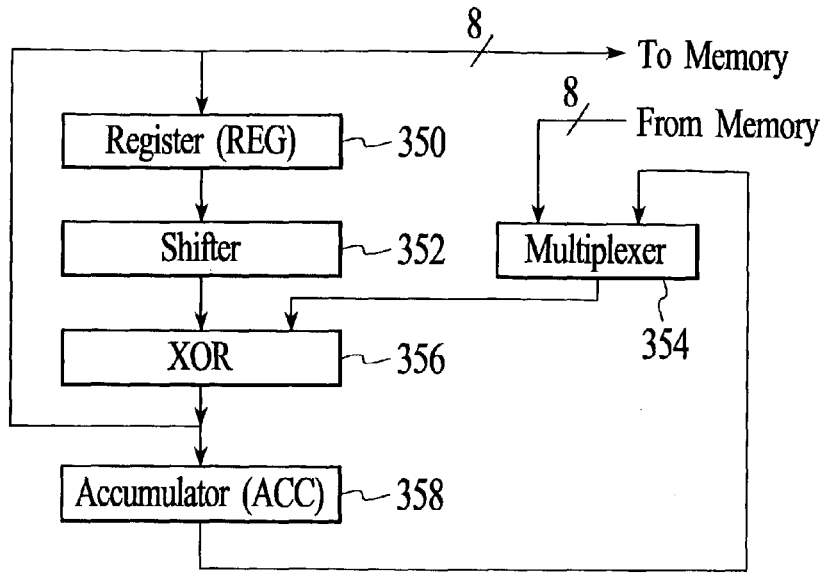

Referring now to FIG. 5, a byte-oriented memory (not shown) contains the information bytes, with five bytes representing the forty bit LFSR data. For the structure shown in FIG. 5, the feedback byte is computed and stored in a register (REG) 350, while the computation occurs through the use of a shifter 352, multiplexer 354, exclusive-OR gate (XOR) 356, and accumulator (ACC) 358 in accordance with the following pseudo code. In the notation used, REG_R(k) represents a logical right shift of the feedback byte by k positions for k=1 to 7, while REG_L(k) represents a logical left shift of the feedback byte by k positions for k=1 to 7. The information byte is represented as d[0:7], and the five LSFR bytes are represented with LSFR[39:32], LFSR[31:24], LFSR[23:16], LFSR[15:8], and LFSR[7:0]. The sixteen possible outputs from the shifter element 352 are represented in FIG. 6. The LSFR values are set to zero for the first iteration.

1. Compute the feedback byte
    (e.g.,
    REG←d[0:7]
    REG←REG⊕LFSR[39:32])
2. Update the five LFSR bytes
    (e.g.,
    ACC←LFSR[31:24]
    LFSR[39:32]←ACC⊕REG_R(6)
    ACC←LFSR[23:16]⊕REG_R(7)
    ACC←ACC⊕REG_R(1)
    LFSR[31:24]←ACC⊕REG_L(2)
    ACC←LFSR[15:8]⊕REG_L(1)
    LFSR[23:16]←ACC⊕REG_L(7)
    ACC←LFSR[7:0]⊕REG_R(5)
    LFSR[15:8]←ACC
    ACC←REG
    LFSR[7:0]←ACC⊕REG_L(3) )
3. Repeat routine as needed
    (e.g., The routine is repeated 23 times to process the 184 information bits (23 information bytes).)

In addition to LSFR operations, the channel coder 310 also performs the processing necessary for the various wireless standards that employ convolutional codes for the inner codes of their concatenated coding schemes. Typically, a convolutional encoder will be represented by its constraint length (k), rate (R=m/n, denoting the encoding of 'm' message symbols into 'n' coded symbols, and generator polynomials that describe the connections between a k-stage shift register and modulo-2 adders, as is well understood in the art.

Figure 7:
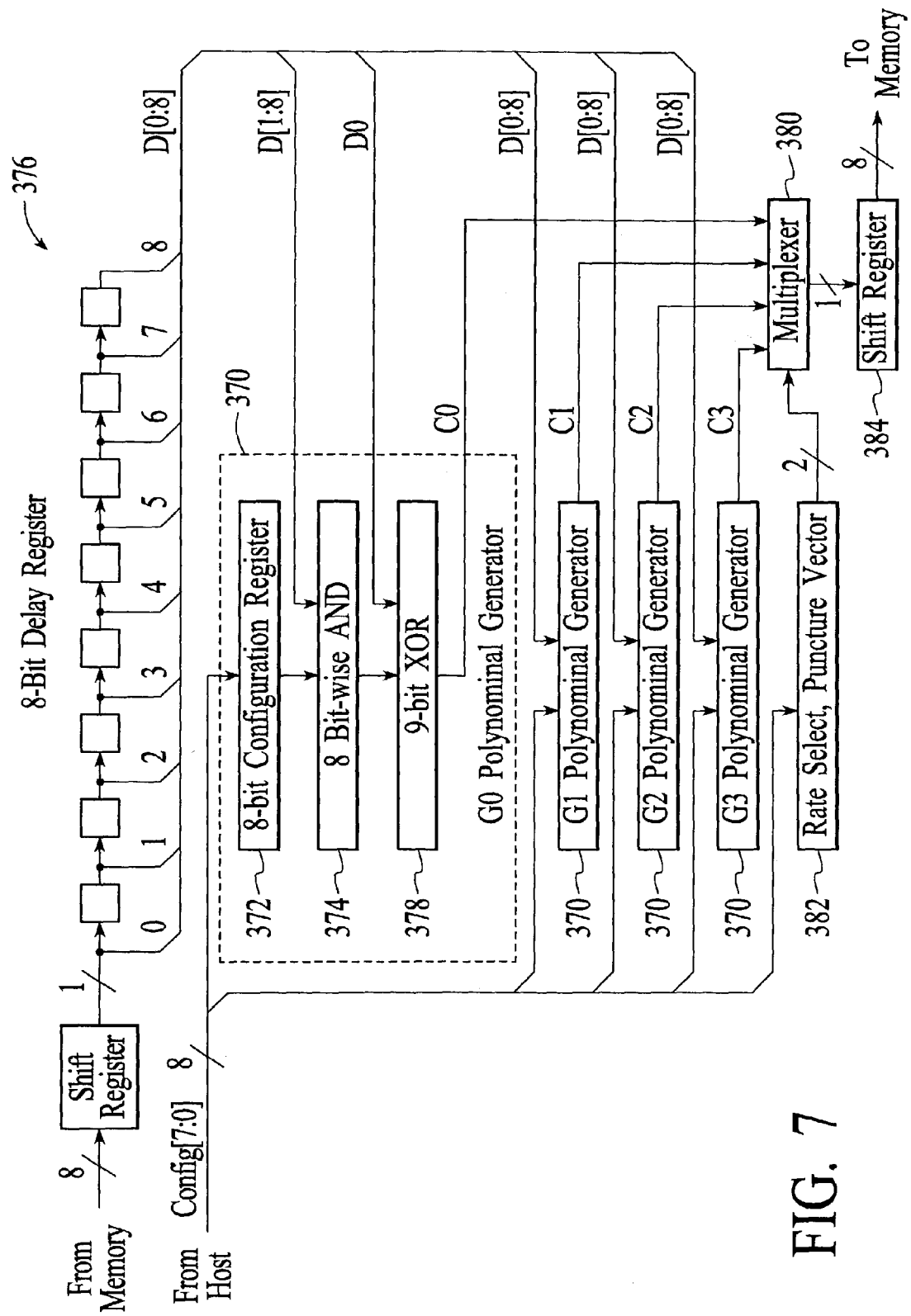

In accordance with the present invention, a byte-oriented, special purpose computational element interfaced to a byte-wide memory and a simple load/store-type programming model performs the encoding function for all of the convolutional codes identified below in the channel coder 310. FIG. 7 illustrates the convolutional encoder element in accordance with the present invention that can perform encoding functions for convolutional codes, including:

the GSM standard rate ½, constraint length $G0=1+D^3+D^4$ $G1=1+D+D^3+D^4;$ the IS-136 TDMA rate ½, constraint length 6

$G0=1+D+D^3+D^5$ $G1=1+D^2+D^3+D^4+D^5;$ the IS-136 TDMA rate ¼, constraint length 6

$G0 = 1 + D + D^3 + D^4 + D^5$ $G1 = 1 + D + D^2 + D^5$ $G2 = 1 + D + D^2 + D^3 + D^5$ $G3 = 1 + D^2 + D^4 + D^5;$ the IS-95 CDMA rate ⅓ constraint length 9

$G0 = 1 + D^2 + D^3 + D^5 + D^6 + D^7 + D^8$ $G1 = 1 + D + D^3 + D^4 + D^7 + D^8$ $G2 = 1 + D + D^2 + D^5 + D^8;$ and the IS-95 CDMA rate ½, constraint length 9

$G0=1+D+D^2+D^3+D^5+D^7+D^8$ $G1=1+D^2+D^3+D^4+D^8.$

As shown in FIG. 7, the convolutional element supports these convolutional codes through polynomial generators 370, each of which includes a configuration register 372 that receives configuration data from the host controller 120, provides that data to an AND component 374 for logical combination with delay data from a delay register 376, the result of which gets logically combined with the delay data via an XOR component 378. Selection of an appropriate output from the polynomial generators 370 is performed via a multiplexer 380 controlled by a rate selector 382. The output of the multiplexer 380 then gets shifted via a shift register 384 and sent to memory. With the convolutional encoder shown in FIG. 7, the channel coder 310 of the present invention supports all rate ½, ⅓, and ¼ convolutional codes, any constraint length up to k=9, and arbitrary puncturing.

These convolutional codes are decoded usually with a simple iterative process known as the Viterbi algorithm, where a Viterbi decoder determines the encoder state using a maximum likelihood technique. To determine the encoder state, the Viterbi algorithm normally generates a set of $2^{(k-1)}$ state metrics that measure the occurrence probability for each of the $2^{(k-1)}$ possible encoder states. As the state metrics are computed, a decision is formed for each of the $2^{(k-1)}$ possible states to determine the probable path taken to arrive at that particular state. These decisions are stored in a path memory that is traced backward to generate the decoded output.

A Trellis structure is a common method for representing a convolutional encoder's state transitions over time. The convention is that an input '0' corresponds to the selection of the upper branch, and an input '1' corresponds to the selection of the lower branch. Each possible input sequence corresponds to a particular path through the trellis.

The Viterbi algorithm compares the two paths entering each node and retains only the path with the better metric. The other path is discarded, since its likelihood never can exceed that of the retained path no matter what data are subsequently received. The retained paths are called survivors.

Commonly, the computational element of a Viterbi decoder is called an Add-Compare-Select (ACS) unit, since it consists of adders, comparators, and selectors. It is used to update a set of path metrics for the surviving hypotheses by adding appropriate branch metrics to the path metrics of the precursor hypotheses.

Figure 8:
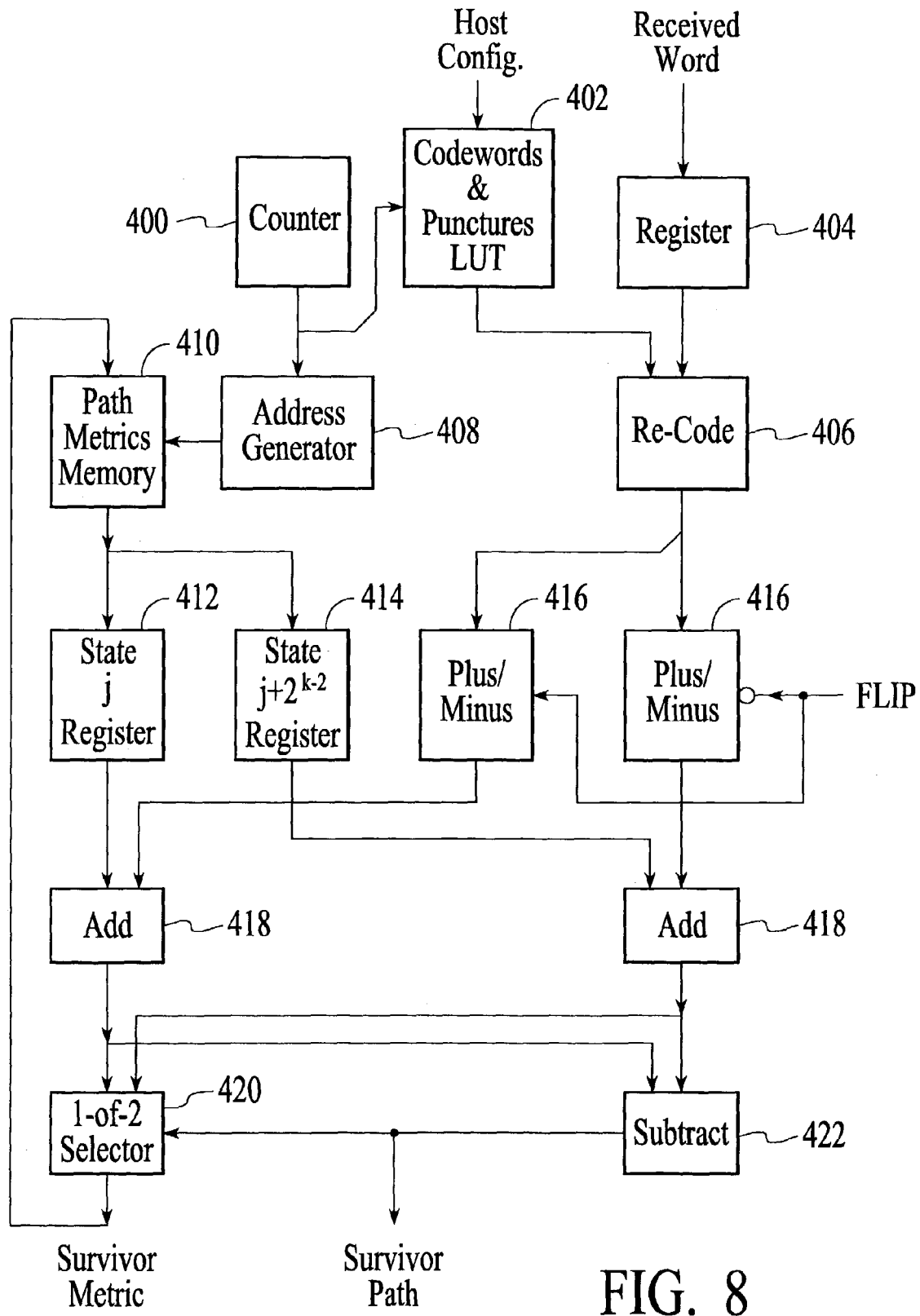

A block diagram of a Viterbi decoder computation element of channel coder 310 in accordance with the present invention is illustrated in FIG. 8. As illustrated, the Viterbi decoder element includes a counter 400, codeword and punctures look-up table (LUT) 402, register 404, recode logic 406, an address generator 408, path metrics memory 410, state registers 412 and 414, plus/minus adjusters 416, adders 418, selector 420, and comparator 422. In operation, these components of the Viterbi decoder computation element compute pairs of survivor path metrics by adding appropriate branch metrics to pairs of precursor path metrics. The sums are compared, and the better (lower) results are selected. The element performs the memory-to-memory, in-place algorithm. Survivor path bits are aggregated into bytes, stored in byte memory, and subsequently backward path-traced to generate the decoder output.

For the branch metrics, the Hamming distance between the received word and the code words, i.e., the sums of the bit-wise mismatches between the received words and the code words, are used. For rate ½, ⅓, and ¼ codes, received words and code words will consist of two, three, and four bits, respectively. For punctured codes, stored tables are used to indicate the punctured bits that are disregarded in the branch metric computation.

The range of the branch metrics (mb) is 0 to 4. For a maximum code constraint length of k=9, the maximum metric range need not exceed $mb \cdot (k-1) = 4 \times 8 = 32$. Using eight bit two's complement arithmetic, the branch metrics range can be increased, if necessary, as is well appreciated by those skilled in the art.

With the Viterbi decoder shown in FIG. 8 along with the other computational elements described with reference to FIGS. 4-7, the channel coder of FIG. 3 is realized in a manner that achieves the ability to be reconfigured and adapted, as needed, to various wireless standards and their different approaches to channel coding operations. From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A reconfigurable system for providing channel coding in a wireless communication device comprising:
   a plurality of computation elements, wherein the plurality of computation elements comprises a data reordering element, a linear feedback shift register (LFSR) element, and a convolutional encoder, and wherein the convolutional encoder comprises a coupled configuration of an input shift register, a delay register, a plurality of polynomial generators, and an output shift register; and
   a controller for reconfigurably controlling the plurality of computation elements to achieve channel coding operations in accordance with a plurality of wireless communication standards.

2. The reconfigurable system of claim 1 wherein each of the plurality of polynomial generators further comprises a configuration register, an AND logic means, and an exclusive-OR logic means.

3. The reconfigurable system of claim 2 wherein the convolutional encoder operates in a byte-oriented manner.

4. The reconfigurable system of claim 1 wherein the plurality of computation elements further comprises a Viterbi decoder element.

5. The reconfigurable system of claim 4 wherein the Viterbi decoder element further comprises a coupled configuration of a counter, a codeword and punctures look-up table, a register, recode logic, an address generator, path metrics memory, state registers, plus/minus adjusters, adders, a selector, and a comparator.

6. The reconfigurable system of claim 1 further comprising memory for storing programs, and wherein the stored programs comprise instructions for reconfiguring the plurality of computational elements for the channel coding operations.

7. The reconfigurable system of claim 1 wherein each of the plurality of computation elements comprises memory for storing programs, and wherein the stored programs comprise instructions for executing commands for the channel coding operations.

8. The reconfigurable system of claim 1, further comprising:
   an interconnection network including reconfigurable connections among the plurality of computation elements;
   wherein the controller reconfigurably controls the plurality of computation elements by controlling reconfiguration of the reconfigurable connections among the plurality of computation elements.

9. A method for providing channel coding in a wireless communication device comprising:
   selecting one of a plurality of wireless communication standards; and
   reconfigurably controlling a plurality of computation elements to achieve channel coding operations in accordance with the selected wireless communication standard, wherein the plurality of computation elements perform data reordering, operations of a linear feedback shift register (LFSR), and convolutional coding, and wherein the convolutional coding comprises performing operations of an input shift register, a delay register, a plurality of polynomial generators and an output shift register.

10. The method of claim 9, further comprising selecting a mode of the selected one of the plurality of wireless communication standards.

11. The method of claim 9, wherein selecting one of the plurality of wireless communication standards comprises:
   receiving a signal associated with one of the plurality of wireless communication standards; and
   identifying the one of the plurality of wireless communication standards based on the coding of the signal.

12. The method of claim 9, wherein the plurality of computation elements comprises a data reordering element, a linear feedback shift register (LFSR) element, and a convolutional encoder, wherein the convolutional encoder further comprises a coupled configuration of an input shift register, a delay register, a plurality of polynomial generators, and an output shift register.

13. The method of claim 9 wherein:
   the plurality of computation elements are connected together with reconfigurable connections of an interconnection network; and
   reconfigurably controlling the plurality of computation elements comprises reconfiguring the reconfigurable connections among the plurality of computation elements.

14. A reconfigurable system for providing channel coding in a wireless communication device comprising:
   a plurality of computation elements, wherein the plurality of computation elements comprises a data reordering element, a linear feedback shift register (LFSR) element, and a convolutional encoder, and wherein the convolutional encoder comprises a coupled configuration of an input shift register, a delay register, a plurality of polynomial generators, and an output shift register; and a controller for reconfigurably controlling the plurality of computation elements to achieve channel coding operations in accordance with a plurality of wireless communication modes within a wireless communication standard.

15. The reconfigurable system of claim 14 wherein each of the plurality of polynomial generators further comprises a configuration register, an AND logic means, and an exclusive-OR logic means.

16. The reconfigurable system of claim 14 wherein the convolutional encoder operates in a byte-oriented manner.

17. The reconfigurable system of claim 14 wherein the plurality of computation elements further comprises a Viterbi decoder element.

18. The reconfigurable system of claim 14 wherein the Viterbi decoder element further comprises a coupled configuration of a counter, a codeword and punctures look-up table, a register, recode logic, an address generator, path metrics memory, state registers, plus/minus adjusters, adders, a selector, and a comparator.

19. The reconfigurable system of claim 14 further comprising memory for storing programs, and wherein the stored programs comprise instructions for reconfiguring the plurality of computational elements for the channel coding operations.

20. The reconfigurable system of claim 14 wherein each of the plurality of computation elements comprises memory for storing programs, and wherein the stored programs comprise instructions for executing commands for the channel coding operations.

21. The reconfigurable system of claim 14, further comprising:
an interconnection network including reconfigurable connections among the plurality of computation elements;
wherein the controller reconfigurably controls the plurality of computation elements by controlling reconfiguration of the reconfigurable connections among the plurality of computation elements.

22. A method for providing channel coding in a wireless communication device comprising:
selecting one of a plurality of wireless communication modes within a wireless communication standard; and
reconfigurably controlling a plurality of computation elements to achieve channel coding operations in accordance with the selected wireless communication mode, wherein the plurality of computation elements perform data reordering, operations of a linear feedback shift register (LFSR), and convolutional coding, and wherein the convolutional coding comprises performing operations of an input shift register, a delay register, a plurality of polynomial generators and an output shift register.

23. The method of claim 22, further comprising selecting one of a plurality of wireless communication standards.

24. The method of claim 22, wherein selecting one of the plurality of wireless communication standards comprises:
receiving a signal associated with one of the plurality of wireless communication standards; and
identifying the one of the plurality of wireless communication standards based on the coding of the signal.

25. The method of claim 22, wherein the plurality of computation elements comprises a data reordering element, a linear feedback shift register (LFSR) element, and a convolutional encoder, wherein the convolutional encoder further comprises a coupled configuration of an input shift register, a delay register, a plurality of polynomial generators, and an output shift register.

26. The method of claim 22 wherein:
the plurality of computation elements are connected together with reconfigurable connections of an interconnection network; and
reconfigurably controlling the plurality of computation elements comprises reconfiguring the reconfigurable connections among the plurality of computation elements.

27. A method for providing channel coding in a wireless communication device comprising:
receiving a signal associated with one of a plurality of wireless communication standards;
identifying the one of the plurality of wireless communication standards based on the coding of the signal; and
reconfigurably controlling a plurality of computation elements to achieve channel coding operations in accordance with the identified wireless communication standard, wherein the plurality of computation elements perform data reordering, operations of a linear feedback shift register (LFSR), and convolutional coding, and wherein the convolutional coding comprises performing operations of an input shift register, a delay register, a plurality of polynomial generators and an output shift register.

28. The method of claim 27 wherein:
the plurality of computation elements are connected together with reconfigurable connections of an interconnection network; and
reconfigurably controlling the plurality of computation elements comprises reconfiguring the reconfigurable connections among the plurality of computation elements.

29. A method for providing channel coding in a wireless communication device comprising:
receiving a signal associated with one of a plurality of wireless communication modes within a wireless communication standard;
identifying the one of the plurality of wireless communication modes based on the coding of the signal; and
reconfigurably controlling a plurality of computation elements to achieve channel coding operations in accordance with the identified wireless communication mode, wherein the plurality of computation elements perform data reordering, operations of a linear feedback shift register (LFSR), and convolutional coding, and wherein the convolutional coding comprises performing operations of an input shift register, a delay register, a plurality of polynomial generators and an output shift register.

30. The method of claim 29 wherein:
the plurality of computation elements are connected together with reconfigurable connections of an interconnection network; and
reconfigurably controlling the plurality of computation elements comprises reconfiguring the reconfigurable connections among the plurality of computation elements.

* * * * *